United States Patent [19]

Mamantov et al.

[11] Patent Number: 4,493,784
[45] Date of Patent: Jan. 15, 1985

[54] DEHYDRATION OF ALUMINUM CHLORIDE HEXAHYDRATE

[75] Inventors: Gleb Mamantov; Charmaine B. Mamantov, both of Knoxville, Tenn.

[73] Assignee: Atlantic Richfield Company, Los Angeles, Calif.

[21] Appl. No.: 575,109

[22] Filed: Jan. 30, 1984

[51] Int. Cl.³ .................... C09K 3/00; C01F 7/58
[52] U.S. Cl. ................................ 252/182; 204/67; 423/DIG. 12; 423/495
[58] Field of Search ........... 423/DIG. 12, 495, 625, 423/463, 465; 252/518, 182

[56] References Cited

U.S. PATENT DOCUMENTS

| | | | |
|---|---|---|---|
| 3,725,222 | 4/1973 | Russel et al. | 204/67 |
| 4,039,647 | 8/1977 | Wohleber et al. | 423/495 |
| 4,264,569 | 4/1981 | Sinha | 423/495 |
| 4,378,337 | 3/1983 | Dunn, Jr. | 423/495 |

OTHER PUBLICATIONS

Picard, G. et al., *Bull. Soc. Chim. Fr.*, 1981, No. 9–10, Pt. 1, pp. 353–360.
Tremillon, B. et al., *J. Electroanal. Chem.*, 74, 53–67, (Switz., 1976).
Bernard Gilbert et al., "Electrochemistry and the Behavior of Oxide Ions in Chloroaluminate Melts", J. Am. Chem. Soc., Apr. 26, 1978, pp. 2725–2730.

*Primary Examiner*—Edward J. Meros
*Assistant Examiner*—Jackson Leeds
*Attorney, Agent, or Firm*—Craig E. Larson

[57] ABSTRACT

A method for dehydrating aluminum chloride hexahydrate which comprises contacting the hexahydrate with a melt consisting essentially of a chlorobasic mixture of aluminum chloride and alkali metal chloride and then treating the resulting mixture with HCl to form an $AlCl_3$/alkali metal chloride melt enriched in $AlCl_3$. NaCl is a preferred alkali metal chloride.

10 Claims, No Drawings

DEHYDRATION OF ALUMINUM CHLORIDE HEXAHYDRATE

BACKGROUND OF THE INVENTION

1. Field of the Invention

This invention relates to the production of anhydrous aluminum chloride and more particularly relates to an improved process for the production of this material from aluminum chloride hexahydrate by dehydration.

2. Description of the Prior Art

Since the discovery of the process by Hall and Heroult, nearly all aluminum has been produced by electrolysis of alumina dissolved in a molten cryolite-based bath. Despite its industrial dominance, the Hall-Heroult process has several recognized disadvantages. These deficiencies have spurred research to find alternative aluminum production processes.

Among the more attractive alternative processes is the electrolytic reduction of $AlCl_3$. This process, which offers potential advantages over the Hall-Heroult process, comprises electrolysis of anhydrous aluminum chloride dissolved in a molten electrolyte composed of one or more halides having higher electrodecomposition potentials then aluminum chloride (e.g., alkali metal chlorides or alkaline earth metal halides). See U.S. Pat. No. 3,725,222. $AlCl_3$ (which is fed progressively to the electrolysis cells) must contain no more than trace proportions of impurities except for compatible salts of more electropositive metals such as the alkali or alkaline earth metals. For smooth cell operation and acceptably long cell life, the near complete absence of hydrolysis products of aluminum chloride is necessary. Improved methods for producing high-purity, anhydrous aluminum chloride are being sought as a result of the continuing interest in producing aluminum by electrolysis of aluminum chloride.

Unlike many hydrated salts, $AlCl_3.6H_2O$ cannot be dehydrated by simple heating because of the hydrolysis that occurs. Heating to 180° C., even in a stream of HCl, produces alumina. This thermodecomposition is represented by the following equation:

$$2AlCl_3.6H_2O \rightarrow Al_2O_3 + 6HCl + 9H_2O$$

Anhydrous aluminum chloride must therefore be produced by other procedures such as by the reaction of chlorine with either molten aluminum or with aluminum oxide ($Al_2O_3$) in an alumina-containing material such as clay or bauxite. Methods have also been proposed to produce anhydrous aluminum chloride from aluminum chloride hexahydrate.

U.S. Pat. No. 4,264,569 teaches a method for producing anhydrous aluminum chloride which comprises heating aluminum chloride hexahydrate at 200° C.–450° C. until the hexahydrate is substantially decomposed and reacting the decomposed material with a chlorine containing gas at 350° C.–500° C. to produce gaseous anhydrous aluminum chloride. Another process, referred to in the '569 patent, comprises heating aluminum chloride hexahydrate at 100°–500° C. to remove water and HCl and to form a basic aluminum chloride and then heating this material at 600°–900° C. to produce anhydrous aluminum chloride.

Low temperature thermal decomposition of $AlCl_3.6H_2O$ to $Al_2O_3$ in molten chloroaluminate salts of alkali metals is reported by Picard, G., et al., *Bull. Soc. Chim. Fr.*, Vol. 9-10, Pt. 1, pp. 353-60. (1981). They report that alumina formed in situ (in the melt) is more reactive with respect to HCl than $Al_2O_3$ produced by thermodecomposition of the hexahydrate by itself (in the absence of the melt). However, they also report that when adding aluminum chloride hexahydrate to the reactor medium, it is necessary to prevent alumina formation around the grains of the solid because the alumina so formed inhibits further chemical reaction. The temperature below which this coating is negligible was determined to be 120° C. Accordingly, Picard, et al., suggest the following process for producing anhydrous $AlCl_3$ from $AlCl_3.6H_2O$: (1) formation of a suspension of reactive alumina at a temperature of 100°–120° C. in molten mixtures of alkali tetrachloroaluminates, and treatment with HCl (to release water) at temperatures of 400°–500° C. and recovering an alkali tetra-chloroaluminate melt enriched in aluminum (III). Selection of tetrachloroaluminates used to form the reaction medium is dictated by their fusion temperatures: lower-melting mixtures such as mixtures of lithium and sodium chloroaluminates and mixtures of potassium and sodium chloroaluminates are disclosed by Picard, et al. Acidic chloroaluminates (e.g., $AlCl_3/NaCl$ having the molar ratio, 61.4/38.6) were considered but found unsatisfactory.

SUMMARY OF THE INVENTION

A process for dehydrating aluminum chloride hexahydrate has now been discovered which comprises contacting the hexahydrate with a melt consisting essentially of a chlorobasic mixture of at least one alkali metal chloride and aluminum chloride at a temperature within the range of about 160° to 250° C. to form gaseous HCl and an oxychloroaluminate-containing reaction mixture and then contacting said reaction mixture with gaseous HCl at a temperature within the range of about 160° to 250° C. to form and release water from the reaction mixture. Aluminum chloride is recovered in the form of an alkali metal chloride/aluminum chloride melt enriched in aluminum chloride. As such, the product is useful in processes for producing aluminum by the electrolytic reduction of aluminum chloride. Alternatively, anhydrous aluminum chloride may be recovered from the melt produced by the present process using methods known to those skilled in the art.

DETAILED DESCRIPTION OF THE INVENTION

Molten mixtures of aluminum chloride and alkali metal chlorides (referred to herein as MCl) in the vicinity of the tetrachloroaluminate composition (i.e., an equimolar mixture of $AlCl_3$ and MCl) are considered as ionized solvents formed from $AlCl_4^-$ ions and $M^+$ cations. For purposes of this system, an acid is defined as a $Cl^-$ acceptor and a base is defined as a $Cl^-$ donor. The quantity $pCl^- = -\log[Cl^-]$ varies within a limited range for these systems: the minimum value corresponds to melts saturated with alkali chloride; the maximum value corresponds to melts richest in $AlCl_3$. The equimolar mixture, $M^+AlCl_4^-$, is the neutral melt. Melts richer in $AlCl_3$ are chloroacidic melts. Melts richer in MCl are chlorobasic melts; melts wherein the $AlCl_3/MCl$ molar concentration ratios are less than 50.0/50.0 are chlorobasic. The chlorobasic melt contacted with aluminum chloride hexahydrate in the first step of the present invention can be formed from any alkali metal chloride (e.g., LiCl, NaCl, KCl, RbCl, CsCl) or mixtures thereof. However, NaCl is preferred. The proportions of alkali metal chloride and aluminum chloride are chosen to provide a chlorobasic melt, preferably to provide a melt saturated with alkali chloride at the contacting temperatures employed in the first stage of the process. For example, the molar concentration ratio for an AlCl$_3$/NaCl system saturated with NaCl at 175° C. is 49.75/50.25. Excess alkali metal chloride (in addition to that required to form the saturated melt) is desirably present.

Applicants have discovered that it is not possible to obtain the desired reaction between aluminum chloride hexahydrate and chloroaluminate melts unless the chloroaluminates are in the molten state when the hydrate is added. The particular temperature at which the first stage of the present process is operated depends in part, therefore, upon the temperature at which the AlCl$_3$/MCl mixture is molten. The chlorobasic AlCl$_3$/MCl mixture is desirably maintained at a temperature somewhat in excess of its melting point but below the temperature at which significant sublimation of Al$_2$Cl$_6$ occurs. Generally the temperature may be within the range of about 160° to 250° C., preferably within the range of about 160° to 200° C., more preferably within the range of about 165° to 180° C.

While not wishing to be bound by any theory of operability, the reaction between aluminum chloride hexahydrate and chlorobasic chloroaluminate melts that occurs in the first step of the present invention may be represented as follows:

AlCl$_3$.6H$_2$O + 5NaAlCl$_4$ + NaCl → 12HCl + 6NaAlOCl$_2$

The formula for the oxychloroaluminate species is shown as NaAlOCl$_2$ although the exact composition of this species remains to be determined.

The molar ratio of hexahydrate to chlorobasic melt contacted in the first stage is desirably within the range of about 1:5–20, preferably within the range of about 1:15–20.

In the second step of the present process, oxide present in the reaction mixture formed during first stage contacting is removed as water by passing a stream of dry HCl through the reaction mixture. The resulting melt, after passage of HCl, is richer in aluminum chloride (in the form of MAlCl$_4$). This reaction may be represented as follows:

NaAlOCl$_2$ + 2HCl → H$_2$O + NaAlCl$_4$

The temperature of this treatment step is not narrowly critical but generally should be within of about 160° to 250° C., preferably about 160° to 210° C., more preferably about 175°–195° C.

Although various process schemes for carrying out the process of this invention will be apparent to one skilled in the art, in a preferred embodiment, the process is carried out in a continuous manner with the addition of hexahydrate and HCl treatment taking place in separate zones. As noted above, the first stage contacting zone desirably contains chlorobasic melt in excess of that required for reaction with the hexahydrate feed. Furthermore, it is desirable to provide for recycle of melt recovered from the HCl-treatment zone to the first-stage contacting zone. This is conveniently accomplished by adding alkali metal chloride to a portion of the aluminum chloride-enriched melt recovered from the HCl-treatment zone to form a melt consisting essentially of a chlorobasic mixture of alkali metal chloride and aluminum chloride and returning the chlorobasic melt so formed to the first contact zone. The rate of alkali metal chloride addition to the aluminum chloride-enriched melt and the rate of removal of aluminum chloride-enriched melt from the process as product may be balanced with the feedrate of aluminum chloride hexahydrate to provide essentially steady-state operation of the process.

Having outlined the invention, further details are provided by way of specific examples which are illustrative of the present invention.

Oxide contents of AlCl$_3$/NaCl melts, reported in the following examples, were obtained using the voltammetric titration technique described below. Based on electrochemical studies of Ta(V) in saturated AlCl$_3$-NaCl melts, the following equilibrium reaction occurs between Ta(V) and oxide in the melt:

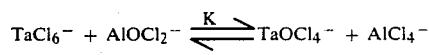

In differential pulse voltammograms of the reduction of Ta(V) in saturated AlCl$_3$/NaCl melts, two peaks are observed for the reduction of Ta(V) to Ta(IV). The first of these peaks (at about ±0.65 volts vs. Al in the saturated melt) is attributable to the reduction of TaCl$_6^-$ to TaCl$_6^{2-}$. The second peak (at about +0.54 volts) is attributable to the reduction of TaOCl$_4^-$ to TaCl$_6^{2-}$. From the ratio of the total current of both peaks to the current of the peak due to the reduction of TaOCl$_4^-$, it is possible to determine the oxide content of the saturated melt according to the following equation:

$$C_{Ta}^{Tot}/C_{TaOCl_4^-} = (1/C_{AlOCl_2^-})(C_{Ta}^{Tot} - C_{TaOCl_4^-}) + (K'C_{AlOCl_2^-} + 1)/K'C_{AlOCl_2^-}$$

where $K' = K/C_{AlCl_4^-}$; $C_{Ta}^{Tot}$ is the total concentration of Ta(V) added; $C_{TaOCl_4^-}$ is the concentration of TaOCl$_4$; and $C_{AlOCl_2^-}$ is the concentration of the oxide species. In a typical oxide determination using the Ta(V) method, TaCl$_5$ is added to the melt in small increments, with a differential pulse voltammogram being obtained after each addition has dissolved in the melt. From the inverse of the slope of the plot of $C_{Ta}^{Tot}/C_{TaOCl_4^-}$ versus $C_{Ta}^{Tot} - C_{TaOCl_4^-}$, constructed from the voltammetric data, the oxide content of the melt is determined.

The apparatus employed in Example 1 consisted of a reaction vessel having a vacuum-sealed glass tube mounted at the top and positioned to feed aluminum chloride hexahydrate through a Rotoflo stopcock into a tube extending into the reaction vessel, said tube terminating above the surface of chloroaluminate melt present in the vessel. The vessel was connected to a vacuum system so that HCl (formed upon addition of hexahydrate to the melt) was continuously removed.

Handling of reactants and products was done in a dry box with a moisture level less than 5 ppm. Chloroaluminate melts were prepared from aluminum chloride (Fluka, anhydrous) which was resublimed, and from sodium chloride dried under vacuum at 300° C. for at least 24 hours.

EXAMPLE 1

A molten mixture of sodium chloride and aluminum chloride which was saturated with sodium chloride at 200° C. ($AlCl_3$/NaCl molar concentration ratio of 49.7/50.3) was brought to a temperature of 175° C. To this mixture was added 0.1676 grams of $AlCl_3.6H_2O$. Vigorous evolution of HCl occured upon addition of hexahydrate to the melt. No $Al_2Cl_6$ was observed in the reaction vessel when hydrate was added to the melt. The melt, before hexahydrate addition, contained 16.34 millimoles oxide. If the hexahydrate reaction with the melt is quantitative, the oxide content of the mixture after reaction should be 547.5 millimoles. The oxide content was found to be 540 millimoles (98.6% of the theoretical value). The qualitative presence of oxide species and the absence of water was verified by infrared spectroscopy.

EXAMPLE 2

A portion of the hydrate-melt reaction mixture (2.511 grams) was diluted with 24.739 grams of the saturated melt initially prepared. HCl gas was bubbled this sample for 6 hours at 195° C. After HCl passage was complete, nitrogen was passed through the melt for 3 hours to remove any HCl that might remain dissolved in the melt. The oxide content of this melt was found to 20.55 millimoles. This corresponds to 91.27% oxide removal efficiency, based on the amount of oxide added to the melt as hydrate.

EXAMPLE 3

Example 2 was repeated except that HCl gas was bubbled through the sample for 3 hours at 195° C. The oxide content of the HCl-treated melt corresponded to 85.45% oxide removal efficiency, based on the amount of oxide added to melt as hydrate.

What is claimed is:

1. A process for dehydrating aluminum chloride hexahydrate which comprises:
    (a) contacting the hexahydrate with a melt consisting essentially of a chlorobasic mixture of least one alkali metal chloride and aluminum chloride at a temperature within the range of about 160° to 250° C. to form gaseous HCl and an oxychloroaluminate-containing reaction mixture;
    (b) contacting said reaction mixture with gaseous HCl at a temperature within the range of about 160° to 250° C. to form and release water from the reaction mixture; and
    (c) recovering an alkali metal chloride/aluminum chloride melt enriched in $AlCl_3$.

2. The method of claim 1 wherein the said chlorobasic mixture is saturated with alkali metal chloride.

3. The method of claim 2 wherein the alkali metal chloride is sodium chloride.

4. The method of claim 1 wherein the temperature of the first stage contacting is within the range of about 160° to 200° C.

5. The method of claim 1 wherein the temperature of first stage contacting is within the range of about 165° to 180° C.

6. The method of claim 1 wherein said treatment with HCl is at a temperature within the range of 160° to 210° C.

7. The method of claim 1 wherein said treatment with HCl is at a temperature within the range of about 175° to 195° C.

8. The method of claim 1 wherein the molar ratio of hexahydrate to said chlorobasic melt is within the range of about 1:5–20.

9. The method of claim 1 wherein the molar ratio of hexahydrate to said chlorobasic melt is within the range of about 1:15–20.

10. The method of claim 1 wherein alkali metal chloride is added to a portion of the aluminum chloride-enriched melt recovered in step (c) to form a melt consisting essentially of a chlorobasic mixture of alkali metal chloride and aluminum chloride and contacting the melt with aluminum chloride hexahydrate as recited in step (a).

* * * * *